United States Patent
Buur et al.

(10) Patent No.: US 8,244,426 B2
(45) Date of Patent: Aug. 14, 2012

(54) METHOD AND APPARATUS FOR MONITORING PROCESSOR INTEGRITY IN A DISTRIBUTED CONTROL MODULE SYSTEM FOR A POWERTRAIN SYSTEM

(75) Inventors: Hanne Buur, Brighton, MI (US); James T. Kurnik, Linden, MI (US); Stephen T. West, New Palestine, IN (US); David Tarby, Chelsea, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 936 days.

(21) Appl. No.: 12/244,835

(22) Filed: Oct. 3, 2008

(65) Prior Publication Data

US 2009/0112392 A1 Apr. 30, 2009

Related U.S. Application Data

(60) Provisional application No. 60/983,165, filed on Oct. 27, 2007.

(51) Int. Cl.
*B60W 20/00* (2006.01)
*G06F 11/07* (2006.01)

(52) U.S. Cl. ............ 701/29.2; 701/32.7; 701/34.4; 340/3.43

(58) Field of Classification Search ............ 701/29, 701/31, 32, 33, 34, 76; 180/65.1, 65.21; 340/3.1, 3.43, 10.5
See application file for complete search history.

(56) References Cited

U.S. PATENT DOCUMENTS

| | | | |
|---|---|---|---|
| 5,363,448 A | 11/1994 | Koopman | |
| 5,495,469 A * | 2/1996 | Halter et al. | 370/212 |
| 5,948,025 A * | 9/1999 | Sonoda | 701/29 |
| 6,125,322 A * | 9/2000 | Bischof et al. | 701/114 |
| 6,628,993 B1 * | 9/2003 | Bauer | 700/20 |
| 6,832,148 B1 | 12/2004 | Bennett | |
| 6,868,318 B1 | 3/2005 | Cawthorne | |
| 7,154,236 B1 | 12/2006 | Heap | |
| 2004/0059496 A1 * | 3/2004 | Pursifull et al. | 701/114 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |

(Continued)

FOREIGN PATENT DOCUMENTS

EP 0903271 A2 3/1999

(Continued)

*Primary Examiner* — Frank Vanaman (57) ABSTRACT

A method for monitoring a main control module operative to command first and second motor control processors of a hybrid powertrain system includes signally connecting a programmable logic device to the main control module and the first and second motor control processors, communicating a first seed signal from the programmable logic device to the main control module, and determining an invalid key signal in the main control module in response to the first seed signal. The invalid key signal is communicated to the programmable logic device.

7 Claims, 4 Drawing Sheets

U.S. PATENT DOCUMENTS

| | | |
|---|---|---|
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0022799 A1* | 2/2006 | Juels ............................ 340/10.1 |
| 2006/0101465 A1* | 5/2006 | Kato et al. .................... 718/100 |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |

| | | |
|---|---|---|
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

FOREIGN PATENT DOCUMENTS

| | | |
|---|---|---|
| EP | 1143314 A1 | 10/2001 |
| EP | 1700762 A1 | 9/2006 |
| GB | 2276023 A | 9/1994 |

* cited by examiner

METHOD AND APPARATUS FOR MONITORING PROCESSOR INTEGRITY IN A DISTRIBUTED CONTROL MODULE SYSTEM FOR A POWERTRAIN SYSTEM

CROSS REFERENCE TO RELATED APPLICATIONS

This application claims the benefit of U.S. Provisional Application No. 60/983,165, filed on Oct. 27, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures can include multiple torque-generative devices, including internal combustion engines and non-combustion machines, e.g., electric machines, which transmit torque through a transmission device to an output member. One exemplary hybrid powertrain includes a two-mode, compound-split, electromechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The machines may transform vehicle kinetic energy transmitted through the vehicle driveline to energy that is storable in an energy storage device. A control system is operative to monitor various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed. A control system can monitor input and control signals and execute algorithms to verify and secure operation of the powertrain.

SUMMARY

A method for monitoring a main control module operative to command first and second motor control processors of a hybrid powertrain system includes signally connecting a programmable logic device to the main control module and the first and second motor control processors, communicating a first seed signal from the programmable logic device to the main control module, and determining an invalid key signal in the main control module in response to the first seed signal. The invalid key signal is communicated to the programmable logic device.

BRIEF DESCRIPTION OF THE DRAWINGS

One or more embodiments will now be described, by way of example, with reference to the accompanying drawings, in which.

DETAILED DESCRIPTION

Figure 1:
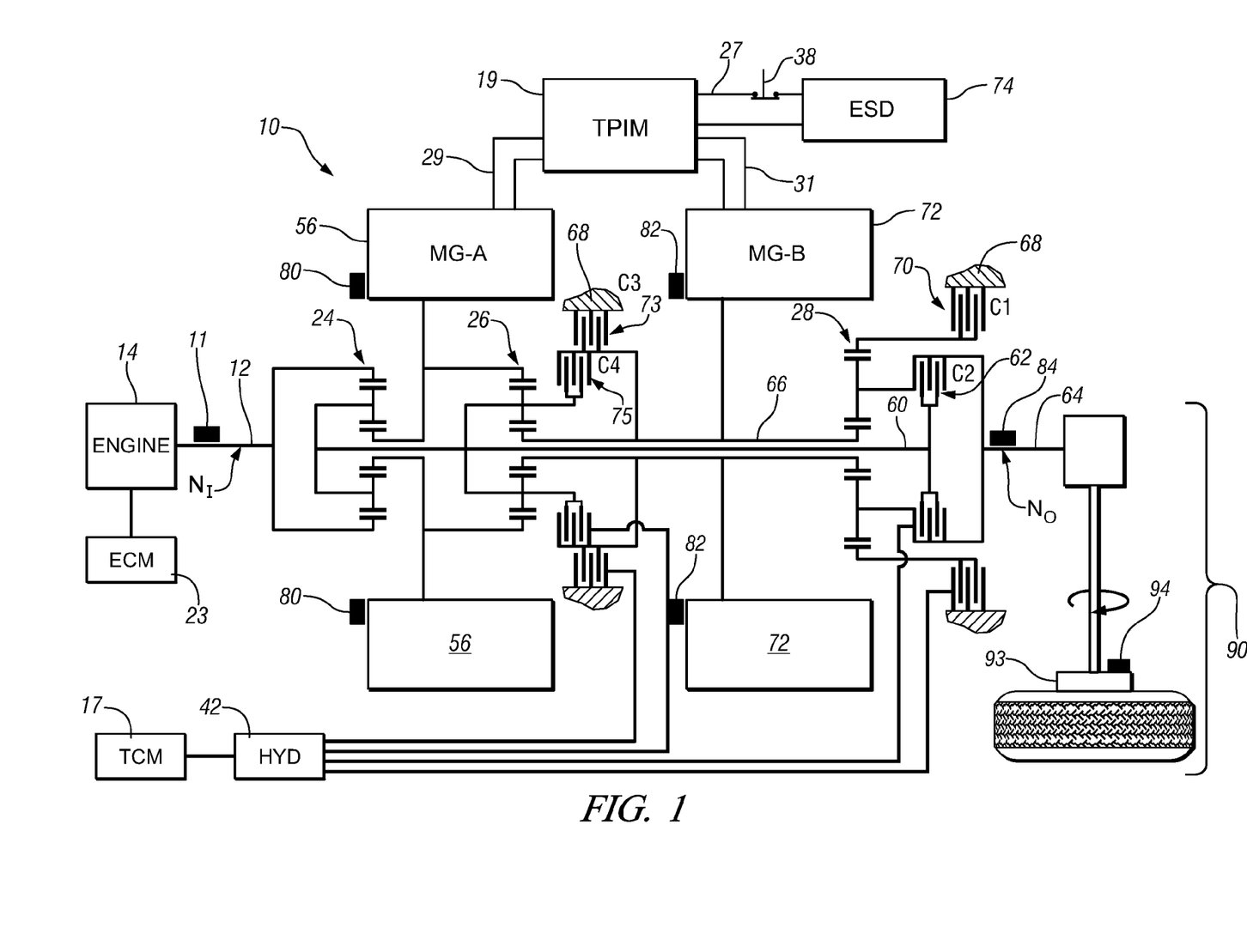
FIG. 1 is a schematic diagram of an exemplary hybrid powertrain, in accordance with the present disclosure.
Figure 2:
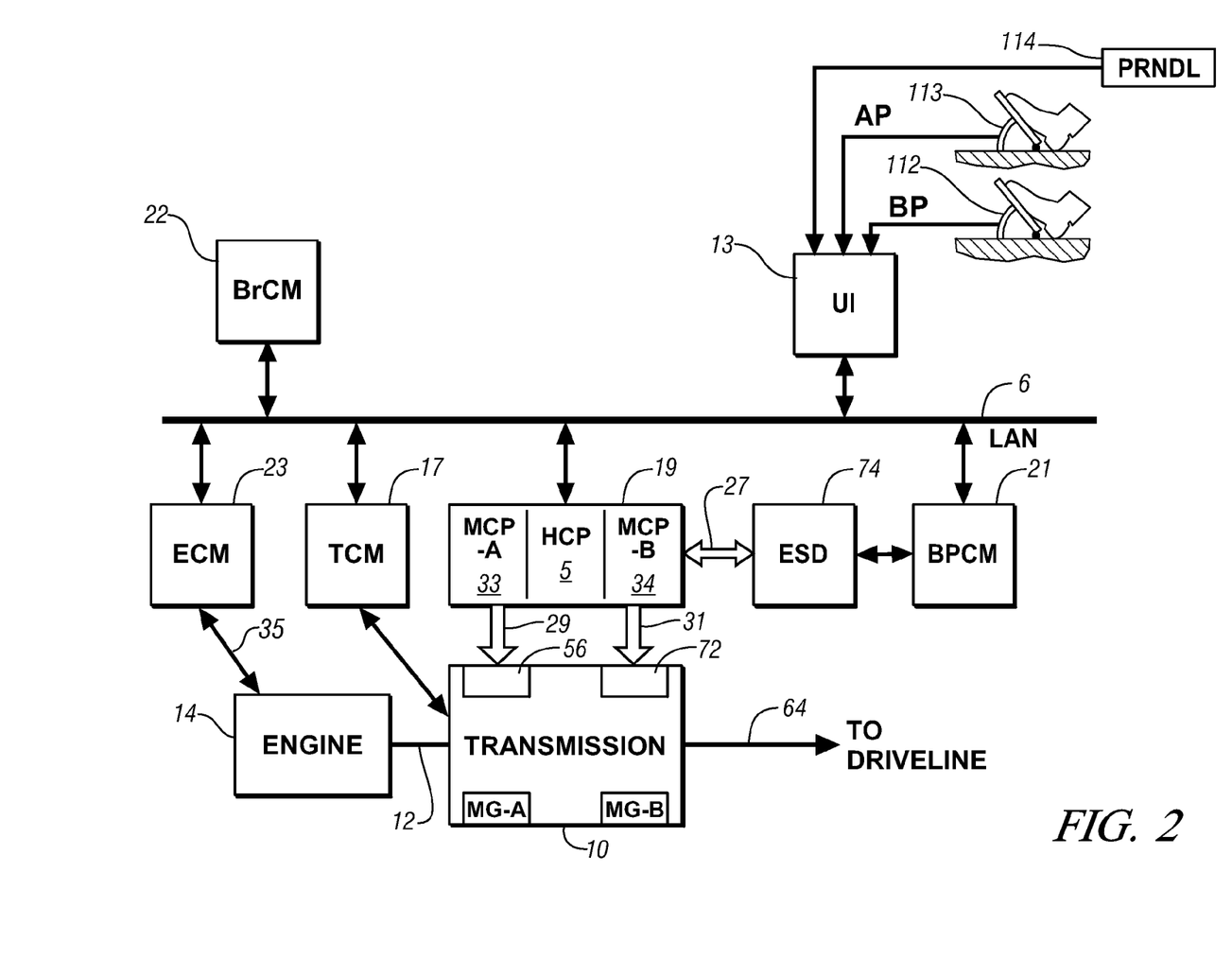
FIGS. 2 and 3 are schematic diagrams of an exemplary architecture for a control system and hybrid powertrain, in accordance with the present disclosure.
Figure 3:
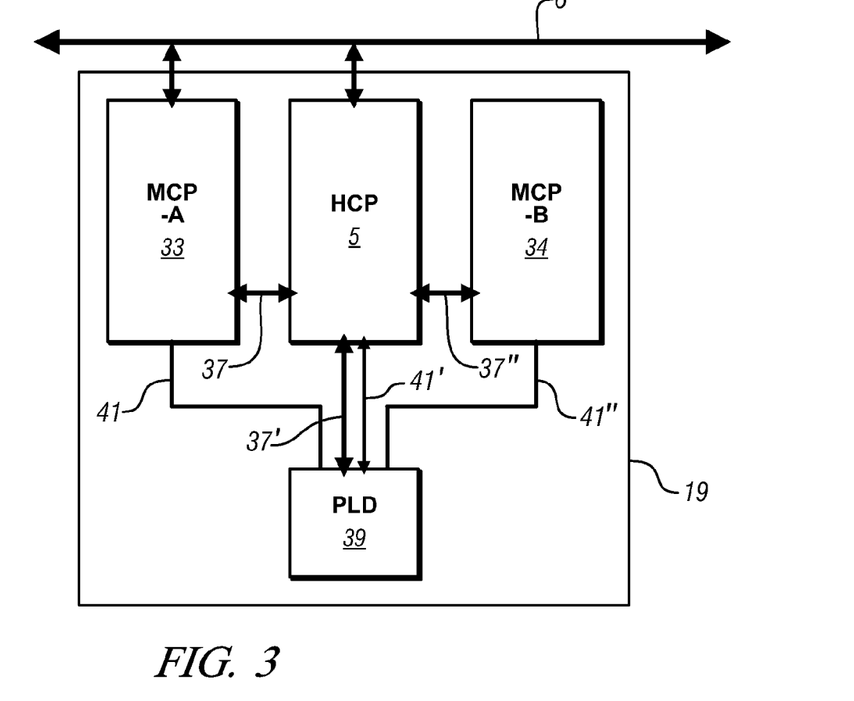

Referring now to the drawings, wherein the showings are for the purpose of illustrating certain exemplary embodiments only and not for the purpose of limiting the same, FIGS. 1, 2 and 3 depict an exemplary electro-mechanical hybrid powertrain and associated control system. The exemplary electromechanical hybrid powertrain in accordance with the present disclosure is depicted in FIG. 1, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input member 12, and can be either a spark-ignition or a compression-ignition engine. The engine 14 includes a crankshaft (not shown) operatively coupled to the input member 12 of the transmission 10. A rotational speed sensor 11 monitors rotational speed of the input member 12. Power output from the engine 14, comprising rotational speed and engine torque, can differ from the input speed $N_I$ and the input torque $T_I$ to the transmission 10 due to placement of torque-consuming components on the input member 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit ('HYD') 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 through a first motor control module ('MCP-A') 33 using transfer conductors 29, and the TPIM 19 similarly transmits electrical power to and from the second electric machine 72 through a second motor control module ('MCP-B') 34 using transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 preferably includes a hybrid control module (hereafter 'HCP') 5 and the pair of power inverters and respective motor control modules 33 and 34 configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIGS. 2 and 3 are schematic block diagrams of the distributed control module system of the control system. As used herein, the term 'control system' is defined as the control modules, wiring harnesses (not shown), communications links, sensors and actuators that monitor and control operation of the powertrain system. The control system monitors sensor inputs and commands outputs for controlling the actuators. The distributed control module system comprises a subset of overall vehicle control architecture, and provides coordinated system control of the exemplary hybrid powertrain described in FIG. 1. The control system includes the distributed control module system for synthesizing information and inputs, and executing algorithms to control actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. The HCP 5 provides supervisory control and coordination of the ECM 23, the TCM 17, the BPCM 21, and the TPIM 19. A user interface ('UI') 13 is preferably signally connected to a plurality of devices through which a vehicle operator controls, directs, and commands operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction. The user interface 13 can comprise a single device, as shown, or alternatively can comprise a plurality of user interface devices directly connected to the individual control modules (not shown).

The aforementioned control modules communicate with other control modules, sensors, and actuators via a communications link comprising a local area network (hereafter 'LAN') bus 6, in this embodiment. The LAN bus 6 allows for structured communication between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communications between the MCP-A 33 and the HCP 5 and between the MCP-B 34 and the HCP 5 is preferably effected using direct links preferably comprising serial peripheral interface (hereafter 'SPI') buses 37. Communication between individual control modules can also be effected using a wireless link, e.g., a short range wireless radio communications bus (not shown).

The HCP 5 provides supervisory control of the hybrid powertrain, serving to coordinate operation of the ECM 23, TCM 17, MCP-A 33, MCP-B 34, and BPCM 21. Based upon various command signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The HCP 5 sends commands to specific control modules to effect control of the engine 14, transmission 10 and the first and second electric machines 56 and 72.

A programmable logic device ('PLD') 39 is signally connected to the HCP 5 and MCP-A 33 and MCP-B 34. The PLD 39 preferably comprises a microprocessor controlled device that is adapted to monitor functionality of the HCP 5, and is monitored by the HCP 5.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates control signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates actuator control signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

FIG. 3 shows details of the TPIM 19. The MCP-A 33 and the HCP 5 are preferably signally connected to the LAN 6. MCP-A 33 and MCP-B 34 are directly signally connected to the HCP 5 using first and second SPI buses 37 and 37" which are preferably dedicated, i.e., communicate exclusively between the HCP 5 and the MCP-A 33 and the HCP 5 and the MCP-B 34, respectively. The PLD 39 is signally connected to the HCP 5, preferably using a third dedicated SPI bus 37'. The PLD 39 is directly signally connected to each of the MCP-A 33, MCP-B 34 and the HCP 5 preferably via dedicated electric lines 41, 41", and 41' respectively, preferably comprising direct electrical connections in the form of electric cables or board traces on a printed wiring board. The PLD 39 generates a discrete signal output comprising either a digital '1' or a digital '0' that it communicates to each of the MCP-A 33, MCP-B 34 and the HCP 5 via the electric lines 41, 41', and 41".

Each of the control modules ECM 23, TCM 17, HCP-5, MCP-A 33, MCP-B 34, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses 37, 37', 37". The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque actuators to meet the operator torque request at the output member 64 for transference to the driveline 90. The torque actuators preferably include a plurality of torque generative devices, e.g., the engine 14 and the first and second electric machines 56 and 72 and a torque transferring device comprising the transmission 10 in this embodiment. The HCP 5 determines the operator torque request, an output torque command from the transmission 10 to the driveline 90 and actuator controls including an input torque command from the engine 14, clutch torques for the torque-transfer clutches C1 70, C2 62, C3 73, C4 75 of the transmission 10 and motor torque commands for the first and second electric machines 56 and 72 based upon operator commands from the user interface 13.

Torque security of the hybrid powertrain system can be achieved by executing integrity tests of the control system which include monitoring hardware integrity, monitoring integrity of algorithms and memory devices, securing and monitoring signal integrity during communications within a control module and communications between the control modules, monitoring processor integrity and executing remedial actions. Torque security in the presence of an observed fault can include limiting an actuator command signal. This can include maximum and minimum limits on actuator command signals, and maximum rates of change on actuator command signals. Specifically, motor torque commands $T_A$ and $T_B$ can be limited to maximum and minimum motor torques, and changes in the motor torque commands $T_A$ and $T_B$ can be limited to effect a maximum rate of change in output torque, e.g., 0.2 g.

Securing and monitoring signal integrity is preferably accomplished by individually securing the control modules and securing the serial communications links between the control modules. The distributed control module system of the exemplary embodiment preferably includes each of the torque actuators controlled by a separate control module. This embodiment includes the ECM 23 that monitors sensors and control actuators of the engine 14, the TCM 17 that monitors sensors and control actuators of the transmission 10, the MCP-A 33 that monitors sensors and control actuators of the first electric machine 56, and the MCP-B 34 that monitors sensors and control actuators of the second electric machine. The HCP 5 monitors inputs from and commands operation of the ECM 23, TCM 17, MCP-A 33 and MCP-B 34. Each of the ECM 23, MCP-A 33, MCP-B 34 and TCM 17 is responsible for closed loop monitoring and self-security based on secured commands received from the HCP 5.

Figure 4:
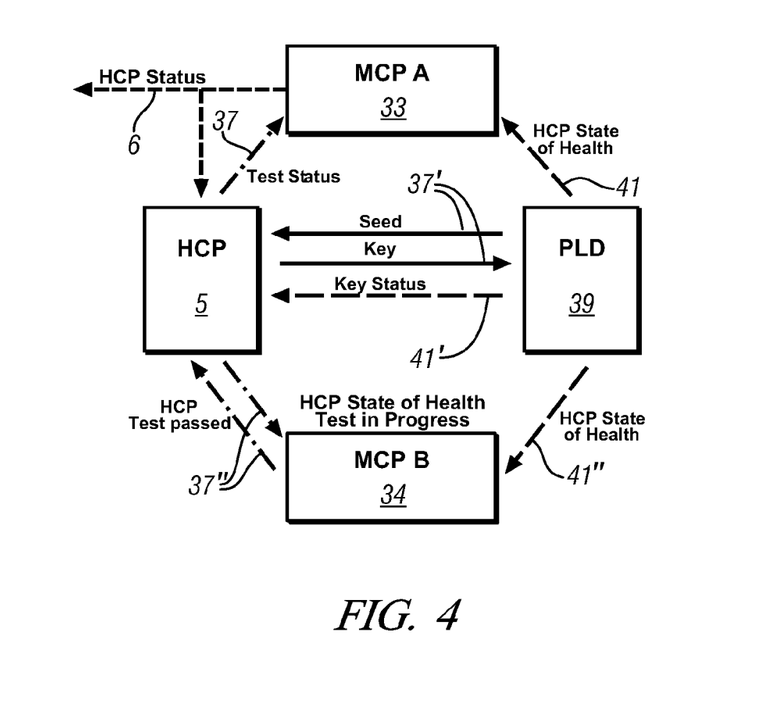
FIGS. 4 and 5 are schematic flow diagrams of a control scheme, in accordance with the present disclosure.

FIG. 4 shows a method for securing and monitoring integrity of the control modules to effect torque security, described hereinbelow with reference to an embodiment comprising the exemplary hybrid powertrain system shown in FIGS. 1, 2, and 3. The method preferably resides in the aforementioned distributed control modules having communications mechanisms and schemes as described herein in the form of executable algorithms and calibrations. The method can be applied to powertrain systems having multiple torque generating devices, including, e.g., an electro-mechanical powertrain system having an engine and a single electric machine, a hybrid powertrain system having multiple electric machines, and hydraulic-mechanical hybrid powertrain systems. Securing and monitoring integrity of the control modules to effect torque security includes controlling and managing the torque and power flow by monitoring control system hardware, algorithms, and signal integrity.

Figure 5:
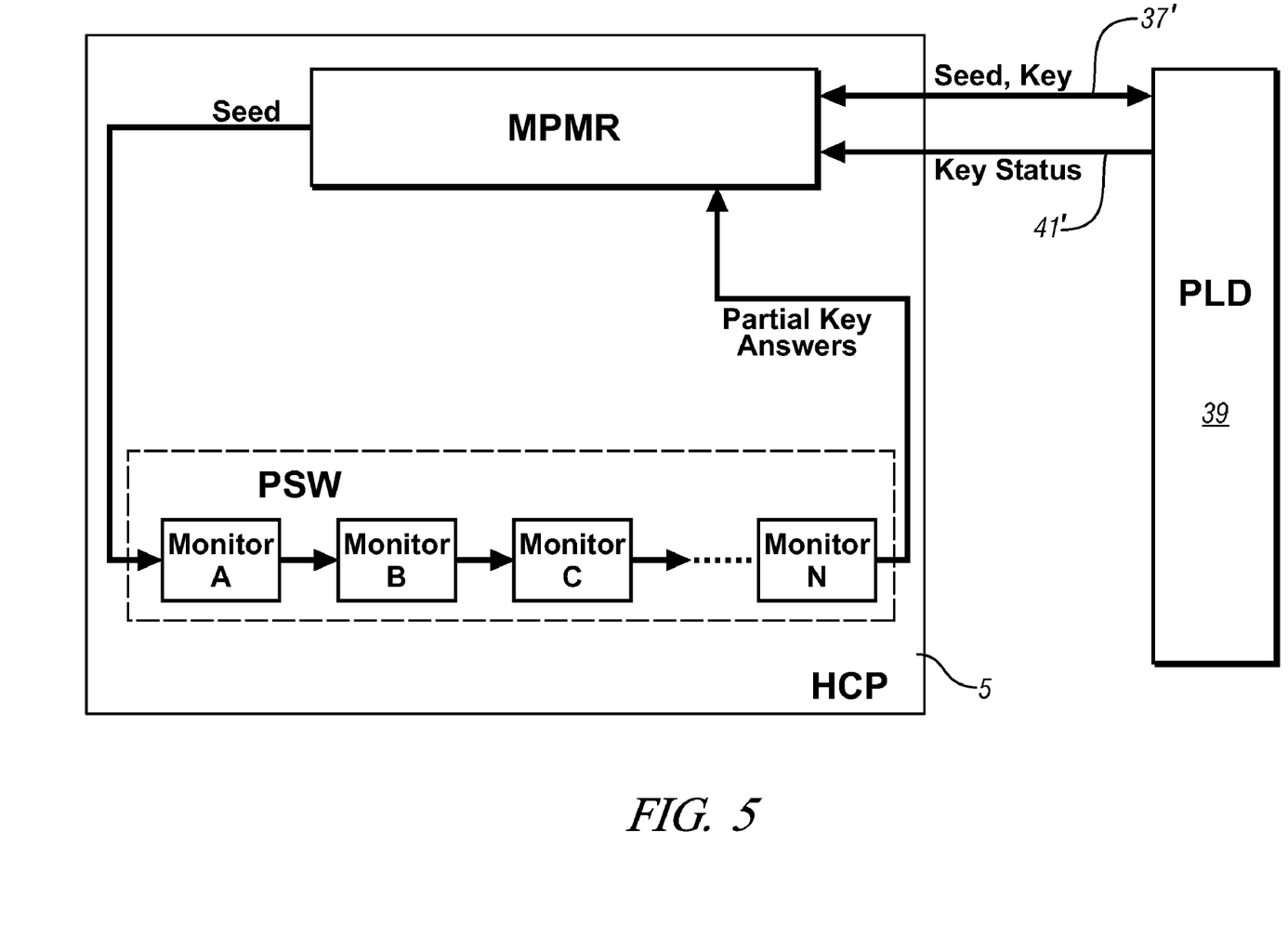

FIG. 5 shows operation of an HCP State of Health monitor executed to monitor integrity of the HCP 5 preferably during each 50 ms loop cycle. In operation, the PLD 39 generates and directly communicates a seed signal ('Seed') to the HCP 5 via the SPI communications bus 37'. The HCP 5 determines a key signal ('Key'), preferably by executing algorithmic code based upon the received seed signal, and then communicates the key signal to the PLD 39 via the SPI communications bus 37'. The key signal indicates whether the most recent seed signal was a valid seed signal. The PLD 39 monitors key signals sent from the HCP 5. The PLD 39 determines a state of the discrete output ('Key Status') on the electric line 41' based upon the most recently received key signal. The state of the discrete output ('Key Status'), i.e., one of a digital '1' and a digital '0', indicates a pass state and a fault state, respectively, for the HCP 5 based upon the key signal. The state of the discrete output ('Key Status') is also sent to MCP-A 33 and MCP-B 34 via the electric lines 41 and 41" respectively. Furthermore, the MCP-A 33 transmits a signal to the LAN 6 that is determined based upon the state of the discrete output ('Key Status'). The discrete output sent to MCP-A 33 and MCP-B 34 indicates absence or presence of a matured fault in the State of Health of the HCP 5.

A program sequence watch function ('PSW') operates in each of the 6.25, 12.5, and 25 ms loop cycles, and determines an order of execution for each of the N monitor functions ('Monitor A', 'Monitor B', 'Monitor C', . . . , 'Monitor N') within the HCP 5. When an order of execution is changed or a monitor function is not called or executed, the PSW function returns an incorrect value for the monitor function. The PSW function detects program pointer errors and instruction set execution errors in the arithmetic logic unit (hereafter 'ALU') of the HCP 5. The seed is preferably input to the first monitor ('Monitor A') and each of the N monitor functions in the PSW function executes based upon the seed, including each generating a partial key answer. This preferably includes operating in each of the 6.25, 12.5, and 25 ms loop cycles to generate specific partial key answers. The partial key answers from the N monitor functions of the PSW function and the seed are combined into a final answer. The main processor monitor function ('MPMR') generates a key specific to the final answer using a predetermined final answer/key lookup table. If one of the PSW functions returns an incorrect value, an invalid key is generated. The key is communicated to the PLD 39 via the SPI bus 37', and the PLD 39 determines whether the key is correct for the communicated seed. The PLD 39 expects to receive a correct key within a predetermined period of time subsequent to sending the seed in order to determine the HCP 5 is functioning correctly. A correct key for the seed indicates that the HCP 5 is functioning properly, resulting in the PLD 39 setting the discrete output ('Key Status') to indicate a pass state. An invalid key for the seed indicates a fault in the HCP 5, resulting in the PLD 39 setting the discrete output ('Key Status') to indicate a fault state.

The PLD 39 selects a seed from one of a plurality of predetermined valid seeds, with the seed selected in a pseudo-random order. The HCP 5 responds with a correct key corresponding to the valid seed unless there is a fault in the State of Health of the HCP 5. After sending the correct key, the HCP 5 monitors the key status on the electric line 41' from the PLD 39 to determine whether the PLD 39 recognized the key as a correct key, using the discrete output to indicate a pass state. When the PLD 39 responds indicating the key is correct, the HCP 5 purposefully sends an invalid key during the next 50 ms loop cycle. The PLD 39 is expected to respond indicating the key is invalid and toggle the key status ('Key Status') on the electric line 41' from the PLD 39, using the discrete output to indicate a fault state, thus indicating to the HCP 5 that the key in invalid. When the PLD 39 recognizes and determines that an invalid key has been sent from the HCP 5 it sends the same seed to the HCP 5 to test the specific operation in the HCP 5. During the next cycle the HCP 5 responds with a correct key. If the PLD 39 did not recognize the invalid key, the HCP 5 sets a fault and responds by sending another invalid key. The HCP 5 records the fault as a mismatch count in a fault maturation algorithm, e.g., an X of Y routine wherein a fault is detected when X mismatches are observed out of immediately preceding Y observations. When the HCP 5 observes X of Y invalid responses on the electric line 41', the HCP 5 indicates a matured fault and takes remedial action. This is repeated until the PLD 39 responds correctly to the invalid keys, or until a period of time has elapsed. A PLD Fault state is indicated when a period of time, e.g., in the range of 200 ms, elapses without the PLD 39 recognizing an invalid key from the HCP 5. When the PLD Fault state is indicated, the HCP 5 commands the torque actuators off and deactivates any presently applied torque transfer clutches to operate the powertrain in neutral mode.

During ongoing operation when the correct key is being received from the HCP 5, the discrete output to the electric lines 41 from the PLD 39, which comprises an indication of the HCP State of Health, is set to the HCP Operational state. When the PLD 39 does not receive a correct key within a predetermined elapsed period of time, it determines a fault has occurred in the HCP and indicates an HCP Fault state to the HCP 5 and the MCP-A 33 and MCP-B 34 using the discrete output from the PLD 39 via electric lines 41. When HCP State of Health is the HCP Operational state, the MCP-A 33 and MCP-B 34 operate as intended. When the HCP State of Health is set to the HCP Fault state, MCP-A 33 and MCP-B 34 disregard all motor torque commands coming from the HCP 5, and preferably set default motor torque commands to zero Nm for the remainder of the key cycle of the vehicle. Preferably the ECM 23 receives the HCP 5 Status via the LAN 6. When HCP the State of Health is in the HCP Operational state, the ECM 23 operates normally to command engine output. When HCP State of Health is set to the HCP Fault state the ECM 23 commands engine torque to zero Nm and controls the engine state to engine-off.

The HCP 5 further tests functionality of the HCP State of Health monitor during a vehicle key-off period. While the test is in progress the HCP 5 sets Hybrid Control Process State of Health Test in Progress to TRUE and communicates this to the MCP-A 33 and MCP-B 34, preferably via the SPI buses 37 and 37". After a predetermined time delay after indication of the Test in Progress, the PLD 39 communicates a valid seed and the HCP 5 purposefully responds with an invalid key in response to the valid seed from the PLD 39. The PLD 39 performs fault detection, and indicates an HCP Fault on the discrete output to electric lines 41 and 41". The MCP-B 34 sends the signal 'Hybrid Control Processor State of Health Test Passed' to the HCP 5 via SPI bus 37" when the Hybrid Control Process State of Health Test in Progress is TRUE and the HCP State of Health indicates an HCP Fault. The HCP 5 monitors the Hybrid Control Processor Status on the LAN bus 6 and Hybrid Control Processor State of Health Test Passed on the SPI bus 37" during the HCP State of Health Monitor Functional Test. When the HCP 5 receives Hybrid Control Processor Status on the LAN bus 6 equal to HCP Fault and Hybrid Control Processor State of Health Test Passed is TRUE, it will set the test status of the HCP State of Health Monitor Functional Test to 'Passed' and return to normal seed/key behavior with the PLD 39. After a predetermined time delay, the Hybrid Control Process State of Health Monitor Functional Test in Progress is set to FALSE. When the HCP 5 does not receive Hybrid Control Processor Status on the LAN bus 6 equal to HCP Fault and Hybrid Control Processor State of Health Test Passed is TRUE on the SPI bus 37" within the predetermined time period, the HCP 5 sets the test status of the HCP State of Health Monitor Functional Test to 'Fault'. The HCP 5 stores the HCP State of Health Monitor Functional Test in a non-volatile memory device. During a subsequent key-on event, if the State of Health indicates a fault, the HCP 5 preferably executes a re-test, and prohibits motor torque commands and engine torque commands above zero Nm if the re-test results in a fault.

Processor integrity is further monitored by executing test functions that detect inconsistencies in one of the memory devices, in general purpose and special purpose registers, ALU execution of instructions, program pointer errors, memory addressing errors, and TPU errors. Methodologies can be applied to detect inconsistencies, including detecting inconsistencies during initialization, detecting inconsistencies during normal execution by running a check function in the background, and detecting inconsistencies by executing a detection algorithm during one of the loop cycles. When an inconsistency is detected, the inconsistency is recorded and a remedial action can be taken. The remedial action is generally of global scope to place the powertrain system in a torque safe state. The remedial action will also include storing an OBD compliant code.

Integrity of system-related hardware including sensors, actuators, transceivers, the SPI buses 37 and the LAN bus 6 and related wiring harnesses can be determined using diagnostics software that monitors data internal to the control module, and rationalizing it in one of the loop cycles. When an inconsistency between monitored data and rationalized data is detected, the inconsistency is recorded as a mismatch count in a fault maturation algorithm, e.g., an X of Y routine wherein a fault is detected when X mismatches are observed out of immediately preceding Y observations. An example is a fault is detected when more than half the immediately preceding observations are mismatches occurring between the monitored data and the rationalized data. When the fault maturation algorithm achieves a threshold number of mismatching observations a fault will be set and a remedial action taken. The remedial action can be actuator-specific or across the entire control system, and preferably places the powertrain in a torque-safe state. The remedial action will also include storing an OBD compliant code for subsequent retrieval. A diagnostic may preliminarily identify a fault pending, meaning an inconsistency has been detected but the fault maturation algorithm has not reached its threshold. Hardware integrity can be determined using diagnostics software that monitors the sensors and actuators of the control system.

Other torque security actions can include limiting an actuator command signal. This can include maximum and minimum limits on actuator command signals, and maximum rates of change on actuator command signals. Specifically, motor torque commands $T_A$ and $T_B$ can be limited to maximum and minimum motor torques, and changes in the motor torque commands $T_A$ and $T_B$ can be limited to maximum rate of change, e.g., 0.2 g.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for monitoring a main control module and first and second motor control processors operative to control first and second torque actuators of a hybrid powertrain system, the method comprising:
    implementing a programmable logic device;
    directly signally connecting a discrete output from the programmable logic device to the main control module and to each of the motor control processors;
    signally connecting the main control module and the programmable logic device via a first communications bus;
    signally connecting each of the main control module and the first motor control processor to a serial communications bus;
    communicating a seed signal from the programmable logic device to the main control module via the first communications bus;
    determining a key signal in the main control module based upon the seed signal;
    communicating the key signal to the programmable logic device via the first communications bus;
    determining a state of the discrete output in the programmable logic device based upon the key signal;
    directly communicating the state of the discrete output from the programmable logic device to the main control module and to each of the motor control processors via electric cables; and
    transmitting a signal determined based upon the state of the discrete output from the first motor control processor to the serial communications bus.

2. The method of claim 1, further comprising
    communicating a first state of the discrete output from the programmable logic device to each of the motor control processors when the key signal corresponds to the seed signal; and
    communicating a second state of the discrete output from the programmable logic device to each of the motor control processors when the key signal does not correspond to the seed signal.

3. The method of claim 2, further comprising effecting communications between the main control module and the first and second motor control processors when the key signal corresponds to the seed signal.

4. The method of claim 2, further comprising the first and second motor control processors selectively disregarding communications from the main control module when the key signal does not correspond to the seed signal.

5. The method of claim 4, comprising commanding zero torque output from the first and second torque actuators.

6. The method of claim 1, further comprising detecting a key-off event;
    communicating a test in progress from the main control module to the first and second first and second motor control processors via second and third communications buses;
    communicating a seed signal from the programmable logic device to the main control module via the first communications bus;
    communicating an invalid key signal from the main control module to the programmable logic device via the first communications bus;
    determining and communicating a state of the discrete output in the programmable logic device based upon the invalid key signal to the main control module and to each of the motor control processors via the electric cables; and
    transmitting a signal that is determined based upon the state of the discrete output from the first motor control processor to the serial communications bus.

7. The method of claim 6, comprising transmitting a signal indicative of a passed test when the state of the discrete output in the programmable logic device indicates a fault.

* * * * *